Patented Jan. 30, 1934

1,945,163

UNITED STATES PATENT OFFICE 1,945,163

PROCESS FOR RECOVERING THE SULPHUR CONTENT OF GASES

Ludwig Rosenstein, San Francisco, and Gustav A. Kramer, Oakland, Calif., assignors to Shell Development Company, San Francisco, Calif., a corporation of Delaware No Drawing. Application May 9, 1932
Serial No. 610,306

9 Claims. (Cl. 23—181)

This invention relates to the separation of acidic gases from either gases or gaseous mixtures, by means of an absorbent agent. By the term "acidic gases" we mean those gases which in water solution have an acid reaction, but which are released unchanged upon sufficient heating of the water. Carbon dioxide, sulphur dioxide and hydrogen sulphide are the main gases of this type which are present in the gaseous mixtures commonly encountered in industrial operations.

The process may be employed for the separation and recovery of these acidic gases from the mixture, or may be employed to purify other gases by removal of said acidic gases therefrom.

More specifically, the invention relates to the treatment of industrial gases and vapors which contain acidic gases, particularly hydrogen sulphide, such as petroleum gas, either natural or refinery gas, coke oven gas, generator gas or other manufactured gas, etc., with an absorbent which permits of the recovery of acidic gases, particularly hydrogen sulphide, in a concentrated form and substantially free of hydrocarbons.

Hydrogen sulphide may be used as initial material for various end-products and it is therefore desirable, for our purpose, to obtain hydrogen sulphide as pure as possible. For example, if it is desired to burn hydrogen sulphide to sulphur dioxide in order to produce sulphuric acid, methods using organic bases or solutions thereof to obtain hydrogen sulphide are objectionable when resort is had to gases containing hydrocarbons as well. Hydrocarbons are appreciably soluble in such solutions and are released along with the hydrogen sulphide when the solution is heated. Combustion of the recovered gas can therefore lead to combustion products such as carbon monoxide, which are undesirable.

We have tested the various absorbents commercially utilized and we have found them deficient, for our purpose, in one respect or another. For example, using a solution of sodium sulphide as absorbent, the following reversible reaction takes place:

$$Na_2S + H_2S \rightleftharpoons 2NaHS$$

On boiling the solution after absorption of hydrogen sulphide to substantial completion, the reaction reversed to the extent of only about 12% and consequently the absorption capacity of the solution on continuous operation was so small as to be impractical. On the other hand, a solution of sodium carbonate absorbs hydrogen sulphide according to the reversible reaction:

$$Na_2CO_3 + H_2S \rightleftharpoons NaHCO_3 + HaHS$$

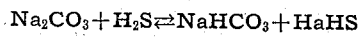

On heating the solution, saturated with hydrogen sulphide, not only was the hydrogen sulphide released but it reacted to a large extent thus:

$$NaHCO_3 + NaHS \rightleftharpoons Na_2S + CO_2 + H_2O$$

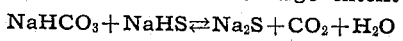

so that sodium sulphide accumulated in the solution until the same condition was established as in the preceding case.

We have discovered that aqueous solutions of $K_3PO_4$, preferably concentrated, are suitable for our purpose as they absorb hydrogen sulphide rapidly and evolve substantially pure hydrogen sulphide on reversing the absorption reaction as by boiling the solution at atmospheric, superatmospheric or at low absolute pressures. The reversal may be carried as far as desirable by continued boiling, and when such boiling is practiced at an elevated temperature, the regenerated solution may be cooled before returning to the absorption step. In case the solution is boiled at a low pressure and corresponding low temperature, cooling of the solution can be dispensed with prior to its return to the absorption step. The regenerated solution may be used in batch, intermittent or continuous processes.

A solution containing both $K_3PO_4$ and $K_2HPO_4$ may be utilized to carry out the absorption of hydrogen sulphide but we prefer to operate with a solution initially containing $K_3PO_4$ only, for while $K_2HPO_4$ in the initial solution results in a higher percentage of the absorbed hydrogen sulphide being evolved for any given time of recovery, it also decreases the capacity of the solution for hydrogen sulphide by limiting the amount of $K_3PO_4$ which can be carried in the solution. We have found that the effective hydrogen sulphide capacity of the solution is greatest for one which initially contains only $K_3PO_4$. Nevertheless, because of the more rapid regeneration, solutions initially containing both $K_3PO_4$ and $K_2HPO_4$ may be found useful, as, for example, in a two stage system in which the gas is scrubbed in series.

Working with an aqueous solution of $K_3PO_4$, we have found that during absorption, $K_3PO_4$ is converted to $K_2HPO_4$, as shown by the reversible reaction:

(1)   $K_3PO_4 + H_2S \rightleftharpoons K_2HPO_4 + KHS$
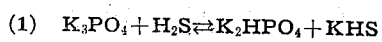

and we have found that this is the reaction which takes place in preference to (2)   $2K_3PO_4 + H_2S = 2K_2HPO_4 + K_2S$

We have determined the desirable maximum concentration at 25° C. to be 2.57 mol. $K_3PO_4$ per 1000 g. aqueous solution. Such a solution is 83% saturated with respect to the K content. If a more concentrated solution is used at this temperature, then the less soluble salt ($K_2HPO_4$) will tend to crystallize out in the absorbing unit. Accordingly the concentration must be adjusted with respect to the $K_2HPO_4$ formed during the absorption and/or added initially so that no substantial crystallization takes place during absorption. At any temperature of operation, a too concentrated solution will deposit crystals. However, if the concentration of the solution is permitted to adjust itself by depositing crystals then the resulting concentration will be the desirable maximum.

We have found, contrary to all expectations, that the sodium phosphates act quite differently. First, the maximum useable concentration of sodium phosphates is much less because of their lesser solubilities, and second, the reversal of the absorption reaction is not nearly as rapid or complete. This is probably due to a formation of sodium sulphide in the reverse reaction, thus:

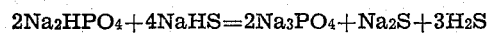
$$2Na_2HPO_4 + 4NaHS = 2Na_3PO_4 + Na_2S + 3H_2S$$

Consequently, sodium phosphate solutions are not nearly as efficient as potassium phosphate solutions, and cannot be considered as equivalents thereof.

The process can be conducted at various temperatures and pressures. The contact between gas or vapor and liquid may be obtained through a scrubbing action, by bubbling the aeriform fluid through the solution or by any conventional method known to the art. For example, the apparatus described in U. S. 1,783,901, may be utilized in effecting intimate contact of a gaseous mixture with the absorbent agent in liquid form. Water which is vaporized with the hydrogen sulphide may be separated therefrom by a condenser at the top of the regenerator as disclosed by the patent, thus maintaining the initial concentration of the absorbent agent substantially constant. If desired, water may be introduced from an outside source at suitable intervals or continuously to maintain the predetermined concentration of the absorbent agent if the condensate is not returned to the regenerator. Since the hydrogen sulphide leaving the system is saturated with water, the water thus removed can be compensated for by introduction from an outside source.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process of recovering hydrogen sulphide from gaseous mixtures, comprising: contacting said gaseous mixtures with an aqueous solution containing $K_3PO_4$ and evolving substantially pure hydrogen sulphide from said solution in substantial amounts.

2. A process of recovering hydrogen sulphide from gases, comprising: contacting said gases containing hydrogen sulphide with an aqueous solution initially containing $K_3PO_4$ and $K_2HPO_4$ and evolving substantially pure hydrogen sulphide from said solution in substantial amounts.

3. A process of recovering hydrogen sulphide from gases, comprising: contacting said gases containing hydrogen sulphide with a substantially saturated aqueous solution containing $K_3PO_4$ and evolving substantially pure hydrogen sulphide from said solution in substantial amounts.

4. A process of recovering hydrogen sulphide from gases, comprising: contacting said gases containing hydrogen sulphide with a substantially saturated aqueous solution containing $K_3PO_4$ and $K_2HPO_4$ and evolving substantially pure hydrogen sulphide from said solution in substantial amounts.

5. A process of recovering hydrogen sulphide from gases, comprising: contacting said gases containing hydrogen sulphide with a solution containing $K_3PO_4$ of such a concentration that at the prevailing temperature and pressure of operation substantially no crystallization takes place during absorption and evolving substantially pure hydrogen sulphide from said solution in substantial amounts.

6. A process of recovering hydrogen sulphide from gases, comprising: contacting said gases containing hydrogen sulphide with a solution containing $K_3PO_4$ whereby a substantial percentage of hydrogen sulphide is absorbed, evolving substantially all the hydrogen sulphide from said solution in a substantially pure state and recycling the substantially regenerated solution for further absorption of hydrogen sulphide.

7. A process of recovering hydrogen sulphide substantially free of hydrocarbons, from gases containing both, comprising: contacting said gases with an aqueous solution containing $K_3PO_4$ and evolving substantially all the hydrogen sulphide from said solution in a substantially pure state by boiling, cooling the boiled-out solution and returning it to the absorption step.

8. A process of recovering hydrogen sulphide substantially free of hydrocarbons, from gases containing both, comprising: contacting said gases with an aqueous solution containing alkaline potassium salts of phosphoric acid to substantial saturation, evolving substantially pure hydrogen sulphide from the said solution in substantial amounts by heating, cooling the evolved gas to condense water and leave substantially pure hydrogen sulphide, cooling the solution and returning it to the absorption step.

9. A process of separating hydrogen sulphide from gaseous mixtures, which includes circulating a solution of $K_3PO_4$ in a closed cycle, passing the gaseous mixture to be treated in contact with said solution at one point in the cycle and heating the solution to remove substantially all of the absorbed hydrogen sulphide at another point in the cycle.

LUDWIG ROSENSTEIN.
GUSTAV A. KRAMER.